United States Patent
Olsson et al.

(10) Patent No.: US 9,848,368 B2
(45) Date of Patent: Dec. 19, 2017

(54) NETWORK NODES AND METHODS FOR HANDLING TRAFFIC TRACING OF A USER EQUIPMENT

(71) Applicant: TELEFONAKTIEBOLAGET LM ERICSSON (PUBL), Stockholm (SE)

(72) Inventors: Andreas Olsson, Stockholm (SE); Diana Andrei, Linköping (SE); Sven Ekemark, Storvreta (SE); Robert Petersen, Linköping (SE); Per-Daniel Stålnacke, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/305,411

(22) PCT Filed: Apr. 25, 2014

(86) PCT No.: PCT/SE2014/050509
§ 371 (c)(1),
(2) Date: Oct. 20, 2016

(87) PCT Pub. No.: WO2015/163801
PCT Pub. Date: Oct. 29, 2015

(65) Prior Publication Data
US 2017/0048776 A1    Feb. 16, 2017

(51) Int. Cl.
*H04W 4/00* (2009.01)
*H04W 36/22* (2009.01)
(Continued)

(52) U.S. Cl.
CPC ............ *H04W 36/22* (2013.01); *H04W 8/18* (2013.01); *H04W 24/08* (2013.01); *H04W 36/14* (2013.01); *H04W 88/06* (2013.01)

(58) Field of Classification Search
CPC . H04W 36/14; H04W 36/0022; H04W 36/30; H04W 88/06; H04W 36/0083;
(Continued)

(56) References Cited

U.S. PATENT DOCUMENTS

2007/0249352 A1* 10/2007 Song .................. H04L 63/08
                                                        455/436
2008/0205345 A1*  8/2008 Sachs ................ H04W 36/0011
                                                        370/332
(Continued)

OTHER PUBLICATIONS

3GPP TS 32.422 V12.1.0 3rd Generation Partnership Project; Technical Specification Group Services and System Aspects; Telecommunication management; Subscriber and equipment trace; Trace control and configuration management (Release 12); Mar. 2014.

Primary Examiner — Fred Casca

(57) ABSTRACT

A method in a first network node for handling traffic tracing of a user equipment. The first network node is comprised in a first Radio Access Technology, RAT, system. The first network node starts a handover procedure to handover the user equipment from the first RAT system to a second RAT system. The user equipment has an active traffic tracing ongoing in the first RAT system. The traffic tracing relates to tracing associated with communication between the user equipment and the first RAT system. The first network node sends a message to a second network node in the second RAT system. The message is sent directly to the second network node or via one or more intermediate network nodes. The message comprises one or more parameters relating to the ongoing traffic tracing of the user equipment. The parameters define when the traffic tracing is to continue in the second RAT system.

19 Claims, 8 Drawing Sheets

(51) Int. Cl.
  *H04W 24/08* (2009.01)
  *H04W 8/18* (2009.01)
  *H04W 36/14* (2009.01)
  *H04W 88/06* (2009.01)
(58) Field of Classification Search
  CPC ......... H04W 36/0061; H04W 36/0066; H04W 36/0055; H04W 48/18; H04W 36/08; H04W 24/10
  USPC ..... 455/436, 437, 444, 434, 439, 458, 552.1
  See application file for complete search history.

(56) References Cited

U.S. PATENT DOCUMENTS

| | | | |
|---|---|---|---|
| 2010/0215026 A1* | 8/2010 | Cheng | H04W 36/385 370/338 |
| 2011/0319115 A1* | 12/2011 | Racz | H04W 24/10 455/514 |
| 2012/0329450 A1 | 12/2012 | Liu | |

* cited by examiner

NETWORK NODES AND METHODS FOR HANDLING TRAFFIC TRACING OF A USER EQUIPMENT

This application is a 371 of International Application No. PCT/SE2014/050509, filed Apr. 25, 2014, the disclosure of which is fully incorporated herein by reference.

TECHNICAL FIELD

Embodiments herein relate to a first network node, a second network node and methods therein. In particular, it relates to handling traffic tracing of a user equipment

BACKGROUND

Wireless terminals for communication such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", Base Transceiver Station (BTS), or AP (Access Point), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

Universal Mobile Telecommunications System (UMTS) is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for terminals. The 3GPP has undertaken to evolve further the UTRAN and GSM based radio access network technologies.

3GPP LTE radio access standard has been written in order to support high bitrates and low latency both for uplink and downlink traffic. All data transmission is in LTE controlled by the radio base station.

Continuous Tracing of UEs in LTE and Systems

In a cellular network it is important to monitor the performance of involved network elements to end users such as UEs, to assure a quality to the end user. It is also important to be able to troubleshoot problem once they have been identified. A powerful tool for the monitoring and especially troubleshooting in cellular networks are the so called Traffic Traces, i.e. the ability to trace traffic events and/or reports in the network nodes involved in the data traffic to and from the UE. There are several different functions defined related to Traffic Traces by 3GPP:

Signalling based subscriber and equipment trace, also referred to as UE Trace, where a specific UE, identified by its International Mobile Subscriber Identity (IMSI) or International Mobile Equipment Identity (IMEI), is traced. This means that signaling to and from the UE and additional node internal information related to the specific UE is gathered by the involved network nodes in both Core Network (CN) and RAN.

Cell traffic trace, also referred to as Cell Trace or Area Based Trace, where similar logging of data is done as in UE Trace but where the UEs to be measured on are decided based on that they are connected to certain specified radio network cells.

Minimization of Drive Test (MDT), which is an extension of signalling based subscriber and equipment trace and cell traffic trace where it is possible to order the UE to send measurements, e.g. to add the UE perspective on performance.

FIG. 1a is a view of a number of management interfaces in a Public Land Mobile Network (PLMN) according to 3GPP 32.101 v11.1.0.

A number of management interfaces in the PLMN is depicted in FIG. 1 such as:

1) Between Network Elements (NEs) and an Element Manager (EM) of a single PLMN Organisation. A network element is a manageable logical entity uniting one or more physical devices. This allows distributed devices to be managed in a unified way using one management system. The term network element means a facility or equipment used in the provision of a telecommunications service. Such term also includes features, functions, and capabilities that are provided by means of such facility or equipment, including subscriber numbers, databases, signalling systems, and information sufficient for billing and collection or used in the transmission, routing, or other provision of a telecommunications service. A PLMN is a regulatory term in telecommunications. A PLMN is a network that is established and operated by an administration or by a Recognized Operating Agency (ROA) for the specific purpose of providing land mobile telecommunications services to the public.

2) Between the EM and a Network Manager (NM) of a single PLMN Organisation;

NOTE: In certain cases the EM functionality may reside in the NE in which case this interface is directly from the NE to the NM. These management interfaces are given the reference name Itf-N and are a primary target for standardization. Itf-N is a standardized name of an Interface, Interface North. It is the interface between an NM and an Domain Manager (DM). Itf-P2P is a standardized name of an Interface, peer to peer, it is the interface between DMs.

3) Between the NM and the Enterprise Systems of a single PLMN Organisation.

4) Between the NMs of a single PLMN Organisation.

4a) Between Domain Managers (DMs) of a single PLMN Organisation.

5) Between Enterprise Systems & Network Managers of different PLMN Organisations.

5a) Between the DMs of different PLMN Organisations.

6) Between NEs.

Main traffic Interfaces in 3GPP nodes are illustrated in FIG. 1b, wherein

Ift P2P is the interface between Operations Support Systems (OSS) Core and Operation Support System for Radio & Core (OSS-RC), S11 is the interface between Serving GPRS Support Node (SGSN) and a Mobility Management Entity (MME), Radio Access Network Application Part (RANAP) is the interface between SGSN and Radio Network Controller (RNC), and S1AP is the interface between an MME and an eNB, and X2AP is the interface between two eNBs.

From an operator perspective, there are some problems:

For Area based tracing, standardization assumes that all UEs that are capable to be measured on shall be included in the trace scope. i.e. UEs to be measured on are decided based on that they are connected to certain specified radio network cells.

To trace all UEs over a large area generates a huge amount of data. One method to reduce data is to sample which UEs to be traced within an area. This is sometimes called UE Fraction, i.e. NEs may select a subset of all UEs that shall be traced. This method is not standardized in 3GPP. This leads to that when a UE enters a new NE, it is random if the area based tracing shall continue for the UE if an UE Fraction was used to select a subset of UEs.

For Subscriber tracing such as e.g. UETR, the solution is very Radio Access Technology (RAT) specific, such as one solution for LTE and one for WCDMA.

SUMMARY

It is therefore an object of embodiments herein to provide a way of improving the performance in a wireless radio network using traffic tracing of a user equipment.

According to a first aspect of embodiments herein, the object is achieved by a method in a first network node for handling traffic tracing of a user equipment. The first network node is comprised in a first Radio Access Technology, RAT, system. The first network node starts a handover procedure to handover the user equipment from the first RAT system to a second RAT system. The user equipment has an active traffic tracing ongoing in the first RAT system. The traffic tracing relates to tracing associated with communication between the user equipment and the first RAT system. The first network node sends a message to a second network node in the second RAT system. The message is sent directly to the second network node or via one or more intermediate network nodes. The message comprises one or more parameters relating to the ongoing traffic tracing of the user equipment. The parameters define when the traffic tracing is to continue in the second RAT system.

According to a second aspect of embodiments herein, the object is achieved by a method in a second network node for handling traffic tracing of a user equipment. The second network node is comprised in a second Radio Access Technology, RAT, system. The second network node starts a handover procedure to handover the user equipment from a first RAT system to the second RAT system. The user equipment has an active traffic tracing ongoing in the first RAT system. The traffic tracing relates to tracing associated with communication between the user equipment and the first RAT system. The second network node receives a message from a first network node in the first RAT system. The message is sent directly to the second network node or via one or more intermediate network nodes. The message comprises one or more parameters relating to the ongoing traffic tracing of the user equipment. The parameters define when the traffic tracing is to continue in the second RAT system. The second network node then continues the traffic tracing of the user equipment in the second RAT system based on the one or more parameters.

According to a third aspect of embodiments herein, the object is achieved by a first network node for handling traffic tracing of a user equipment. The first network node is adapted to be comprised in a first Radio Access Technology, RAT, system. The first network node is configured to start a handover procedure to handover the user equipment from the first RAT system to a second RAT system. The user equipment has an active traffic tracing ongoing in the first RAT system. The traffic tracing relates to tracing associated with communication between the user equipment and the first RAT system. The first network node is further configured to send a message to a second network node in the second RAT system. The message is to be sent directly to the second network node or via one or more intermediate network nodes. The message comprises one or more parameters relating to the ongoing traffic tracing of the user equipment. The parameters define when the traffic tracing is to continue in the second RAT system.

According to a fourth aspect of embodiments herein, the object is achieved by a second network node for handling traffic tracing of a user equipment. The second network node is adapted to be comprised in a second Radio Access Technology, RAT, system. The second network node is configured to start a handover procedure to handover the user equipment from a first RAT system to the second RAT system. The user equipment has an active traffic tracing ongoing in the first RAT system. The traffic tracing relates to tracing associated with communication between the user equipment and the first RAT system. The second network node is further configured to receive a message from a first network node in the first RAT system. The message is adapted to be sent directly to the second network node or via one or more intermediate network nodes. The message comprises one or more parameters relating to the ongoing traffic tracing of the user equipment. The parameters define when the traffic tracing is to continue in the second RAT system. The second network node is configured to continue the traffic tracing of the user equipment in the second RAT system based on the one or more parameters.

Since the parameters relating to the ongoing traffic tracing of the user equipment are transmitted to the second network node, the traffic tracing can continue after Inter RAT handover by means of these parameters. In this way an improved performance in a wireless radio network using traffic tracing of a user equipment is provided.

An advantage is that a traffic tracing can continue between RAT technologies in a efficient manner compared to tracing all the UEs all the time.

BRIEF DESCRIPTION OF THE DRAWINGS

Examples of embodiments herein are described in more detail with reference to attached drawings in which.

DETAILED DESCRIPTION

As part of developing embodiments herein, some problems will first be identified and discussed.

Firstly, as mentioned above, for area based tracing, standardization assumes that all UEs that are capable shall be included in the trace scope.

To trace all UEs over a large area generates a huge amount of data. One method to reduce data is to sample which UEs to be traced within an area. This is sometimes called UE Fraction, i.e. NEs may select a subset of all UEs that shall be traced. This method is not standardized in 3GPP. The problem with this solution today is that there is no standardized way to transfer the knowledge if a UE is a part of the UE fraction or not at handover, neither for Inter eNB nor Inter RAT WCDMA handovers. This leads to that every time an UE enters a new NE, it is random if Tracing shall occur for UE. It would be much better to make sure that if a UE once selected to be included in a UE Fraction it shall be prioritized to be continued to stay in the UE Fraction set.

Secondly, as mentioned above, for subscriber tracing, the solution is very RAT specific, i.e. one solution for LTE and one for WCDMA, and if there is a handover from LTE to WCDMA, the Subscriber tracing is not continued after the handover.

For an Subscriber tracing in which there is a handover between different RATs such as from LTE to WCDMA, there is no solution to make sure that the Subscriber tracing continues after handover. From an operator point of view it is wanted to trace subscribers, independently of which access technology they are in.

For Subscriber tracing such as e.g. UETR, the solution is very Radio Access.

According to embodiments herein, methods of transferring knowledge between a source system in a first RAT and target system in a second RAT in a handover process are provided, which knowledge relates to whether a UE has an active traffic trace ongoing in the source system.

According to some embodiments, methods of transferring knowledge between source and target systems whether a UE was part of UE Fraction in the source system are provided.

Figure 1A:
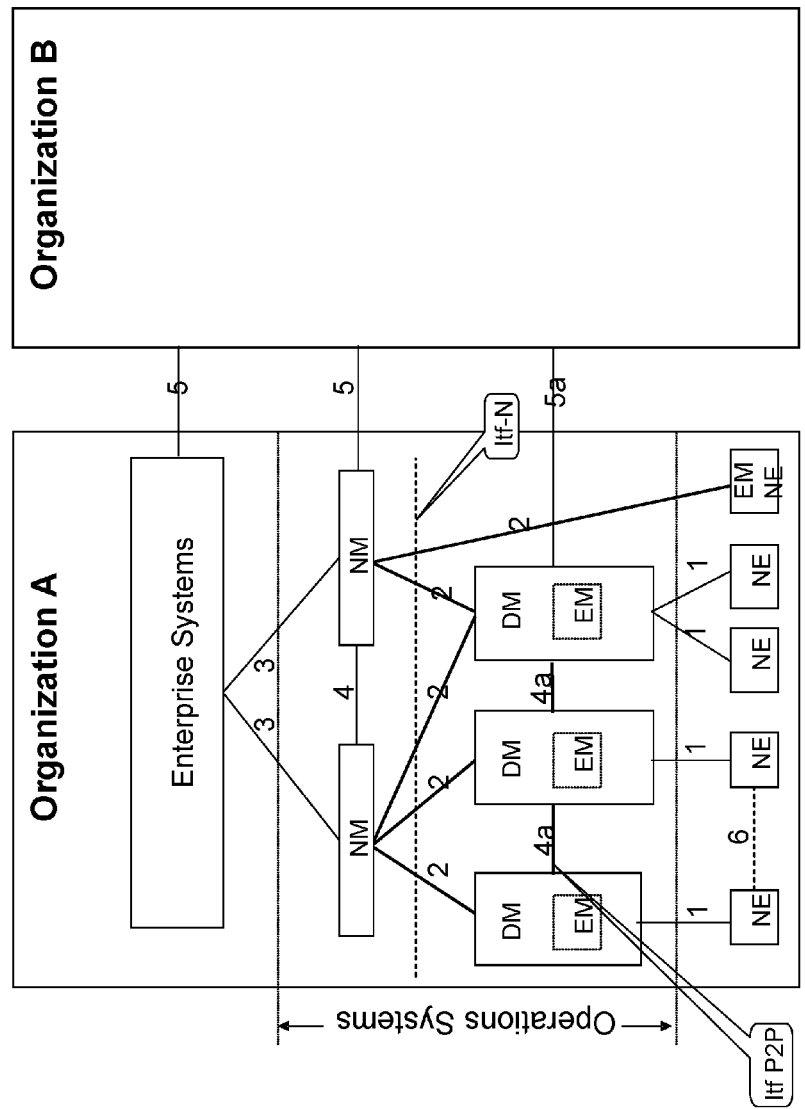
FIG. 1 is a schematic block diagram illustrating interfaces in a PLMN according to prior art.
Figure 1B:
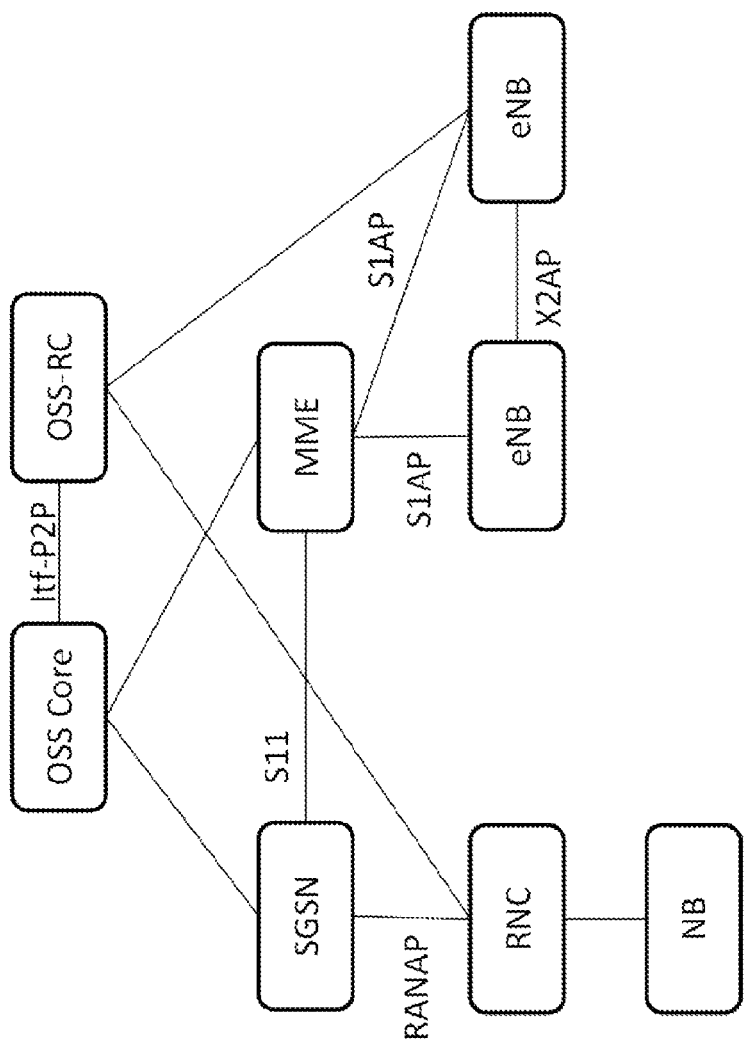
Figure 2:
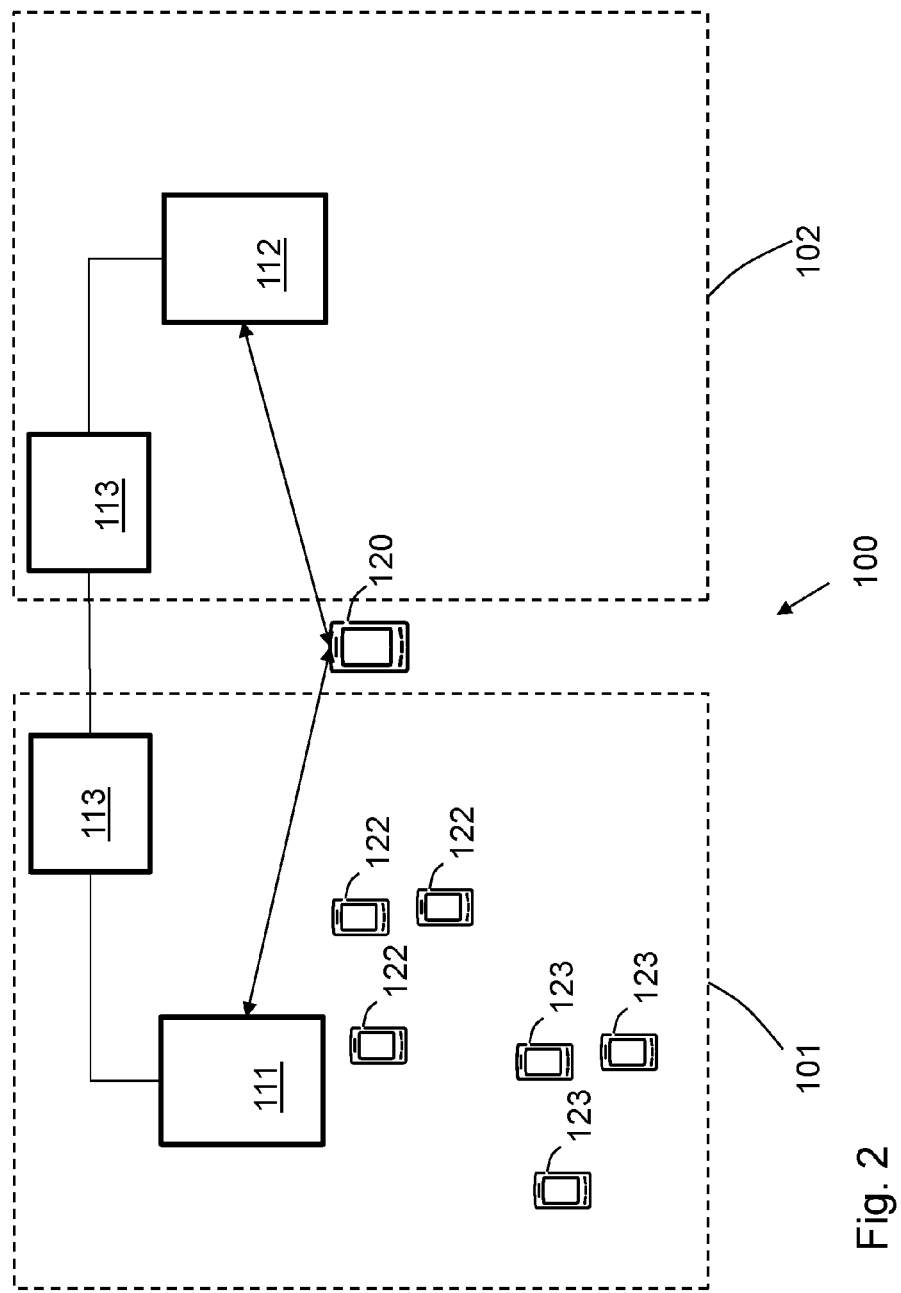
FIG. 2 is a schematic block diagram illustrating embodiments of a wireless

FIG. 2 depicts a wireless communication system 100 in which embodiments herein may be implemented. The wireless radio network 100 comprises a first RAT system 101 and a second RAT system 102. The first RAT system 101 is a wireless communication system of a first RAT, such as anyone out of an LTE, a WCDMA, a WiFi, Wireless Local Area Network (WLAN), a GSM, a Wimax system, or any cellular network or system. The second RAT system 102 is a wireless communication system of a second RAT such as anyone out of an LTE, a WCDMA, a Code Division Multiple Access (CDMA), and a CDMA2000 a GSM, a Wimax system, or any cellular network or system. The first RAT system 101 and the second RAT system 102 are of different types of RATs. For example, the first RAT may be LTE and the second RAT WCDMA, the first RAT may be WCDMA and the second RAT LTE.

The first RAT system 101 comprises a plurality of network nodes whereof one, a first network node 111, is depicted in FIG. 2. The first network node 111 may be a base station, an eNB, an eNodeB, a Home Node B, a Home eNodeB, an RNC, a Base Station Controller (BSC), an Access Point (AC) or any other network node capable to serve a user equipment or a machine type communication device in a wireless communications network.

The second RAT system 102 comprises a plurality of network nodes whereof one, a second network node 112, is depicted in FIG. 2. The second network node 112 may be a base station, an eNB, an eNodeB, a Home Node B, a Home eNodeB, an RNC, a Base Station Controller (BSC), an Access Point (AC) or any other network node capable to serve a user equipment or a machine type communication device in a wireless communications network.

The wireless communication system 100 may further comprises one or more intermediate nodes 113. The first network node 111 may communicate with the second network node 112 via the one or more intermediate nodes 113. Further the first network node 111 and the second network node 112 may each communicate with the one or more intermediate nodes 113. The one or more intermediate nodes may for example be an Mobility Management Entity (MME), a Serving GPRS Support Node (SGSN) where GPRS means General Packet Radio Services.

A number of wireless user equipments are operating in the in the first RAT system 101. In the example scenario of FIG. 2, a user equipment 120 operates in the in the first RAT system 101. The user equipment 120 may e.g. be, a mobile wireless terminal, a mobile phone, a computer such as e.g. a laptop, a Personal Digital Assistants (PDAs) or a tablet computer, sometimes referred to as a surf plate, with wireless capability, or any other radio network unit capable to communicate over a radio link in a wireless communications network. Please note the term user equipment used in this document also covers other wireless terminals such as Machine to machine (M2M) devices.

In an example scenario, the first network node 111 handles a tracing of traffic of the user equipment 120. In a further scenario, the user equipment 120 is part of a user equipment fraction in the first RAT system 101. The user equipment fraction refers to a subset of all user equipments within an area of the first RAT system (101) where only the subset of the user equipments have ongoing traffic tracing. In this example scenario the user equipment 120 and one or more second user equipments 122 are comprised in the user equipment fraction, but not one or more third user equipments 123 comprised in the first RAT system 101.

The traffic tracing may e.g. be area based tracing or subscriber and equipment tracing.

Area based trace: Area based trace data is collected from UEs in a specified area. The area is defined as a list of cells or as a list of tracking/routing/location areas.

Subscriber and equipment trace, also referred to as User Equipment Trace (UETR): UETR data is collected from one specific UE. The UE that is participating in the UETR data collection is specified as IMEI(SV) or as IMSI Example embodiments of methods for handling traffic tracing of the user equipment 120 will described in a view of the first in first network node 111 with reference to a flowchart of FIG. 3 and a combined flowchart and signalling diagram of FIG. 4. The example embodiments of the methods for handling traffic tracing of the user equipment 120 will then be described in a view of the second network node 112 with reference to the combined flowchart and signalling diagram of FIG. 4 and a flowchart of FIG. 5.

The term handover is referred to as HO, and the term user equipment is referred to as UE. in the figures.

Figure 3:
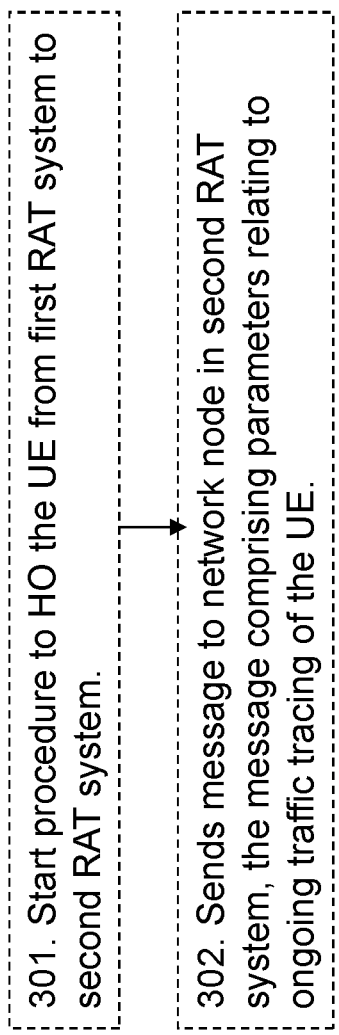
FIG. 3 is a flowchart depicting embodiments of a method in a first network node.
Figure 4:
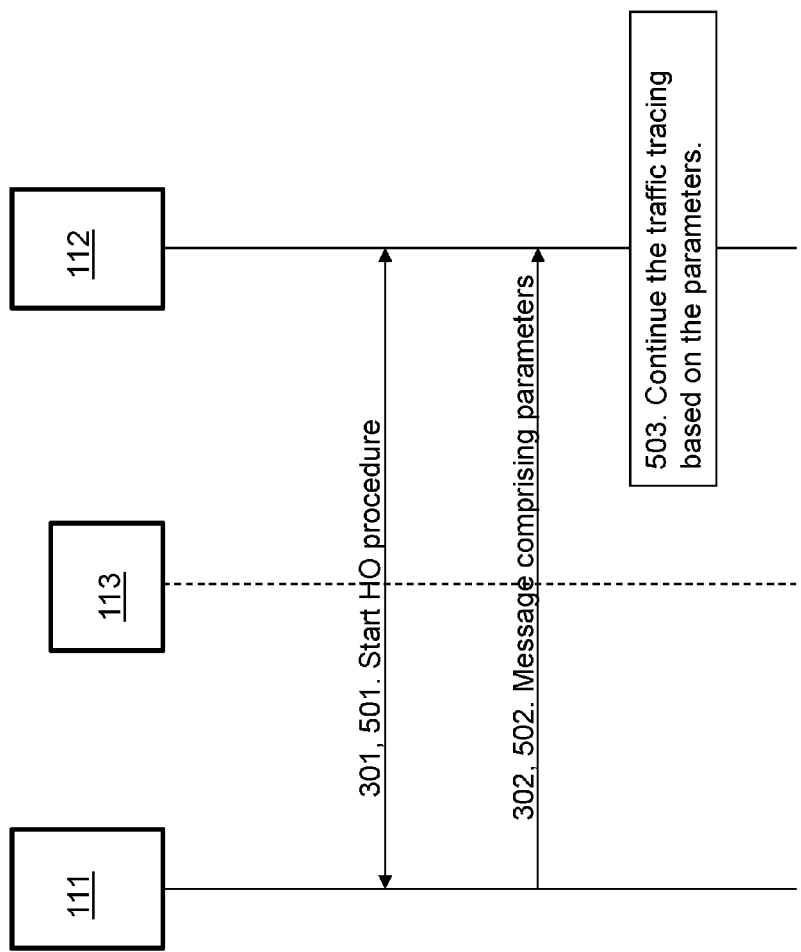
FIG. 4 is a combined signalling diagram and flowchart depicting embodiments of a method.

Example embodiments of a method in the first network node 111 for handling traffic tracing of the user equipment 120 will now be described with reference to the flowchart depicted in FIG. 3 and the combined flowchart and signalling diagram of FIG. 4. As mentioned above, the first network node 111 is comprised in the first RAT system 101.

The method is described in a general way first. The method will then be described more in detail below. The method comprises the following actions, which actions may be taken in any suitable order.

In the example scenario, the user equipment 120 is connected to the first network node 111 in the first RAT system 101 but shall be handed over to connect to the second network node 112 in the second RAT system. This may mean a handover between two different RATs.

In some embodiments, the RAT of the first RAT system 101 is LTE, and the RAT of the second RAT system 102 is WCDMA.

In some embodiments, the RAT of the first RAT system 101 is WCDMA, and the RAT of the second RAT system 102 is LTE.

In some embodiments, the RAT of the first RAT system 101 is LTE or WCDMA and the RAT of the second RAT system 102 is WiFi or WLAN.

In some embodiments, the RAT of the first RAT system 101 is WiFi or WLAN and the RAT of the second RAT system 102 is LTE or WCDMA.

The the RAT of first and second RAT systems 101, 102 may further each be any one out of GSM, WiMax, CDMA, and CDMA2000.

Action 301

The first network node 111 starts a handover procedure to handover the user equipment 120 from the first RAT system 101 to a second RAT system 102.

This start of the handover procedure may be performed by sending an handover order or handover request to the second network node 112. If accepted by the second network node 112, the first network node 111 will receive an acknowledgement from the second network node 112. The user equipment 120 has an active traffic tracing ongoing in the first RAT system 101. The traffic tracing relates to tracing associated with communication between the user equipment 120 and the first RAT system 101. An example of traffic tracing may be Signal to Interference Noise Ratio (SINR) evaluation, Radio Resource Control (RRC) message flow, Throughput, Signal Strength evaluation, Physical Resource Block (PRB) use.

The traffic tracing may e.g. relate to area based tracing or subscriber tracing as defined above.

Action 302

The first network node 111 sends a message to a second network node 112 in the second RAT system 102. The message is sent directly to the second network node 112 or via one or more intermediate network nodes 113. The message comprises one or more parameters relating to the ongoing traffic tracing of the user equipment 120. This is to enable the traffic tracing to be continued when the user equipment 120 has been handed over to the second RAT system 102. The parameters define when the traffic tracing is to continue in the second RAT system 102. I.e. for example whether the second network node 112 shall continue to record tracing data, or stop. If the trace does not continue, it is not possible to evaluate what happened after the handover.

The one or more parameters may comprise a parameter indicating whether or not the user equipment 120 is part of a user equipment fraction in the first RAT system 101. The user equipment fraction refers to a subset of all the user equipments within an area of the first RAT system 101 where only the subset of the user equipments have ongoing traffic tracing. This parameter, when enclosed, is to make sure that if the user equipment 120 once has been selected to be included in a user equipment fraction before the handover, it shall be prioritized to be continued to stay in the user equipment fraction set also after the handover.

The one or more parameters may further comprise any one or more out of:

A trace reference. Recorded Trace data is sent to a trace collection entity, and to be able to connect recorded data for the user equipment 120 from several base stations, the recorded data need an identity so that data records can be connected to each other, that identity is the trace reference. IMSI is not allowed to be used in LTE due to security reasons. See more details below.

In some embodiments, wherein one of the one or more parameters is the trace reference to the user equipment 120, the traffic tracing relates to signalling based subscriber and equipment trace.

A technology preference. May refer to RAT technology.

A service preference. E.g. only record trace data if the service is voice.

A device model preference. E.g. only record trace data if the device is the latest iPhone model (to be used at phone launch).

In some embodiments the one or more parameters are comprised in a transparent container in the message. This will be described more in detail below.

Figure 5:
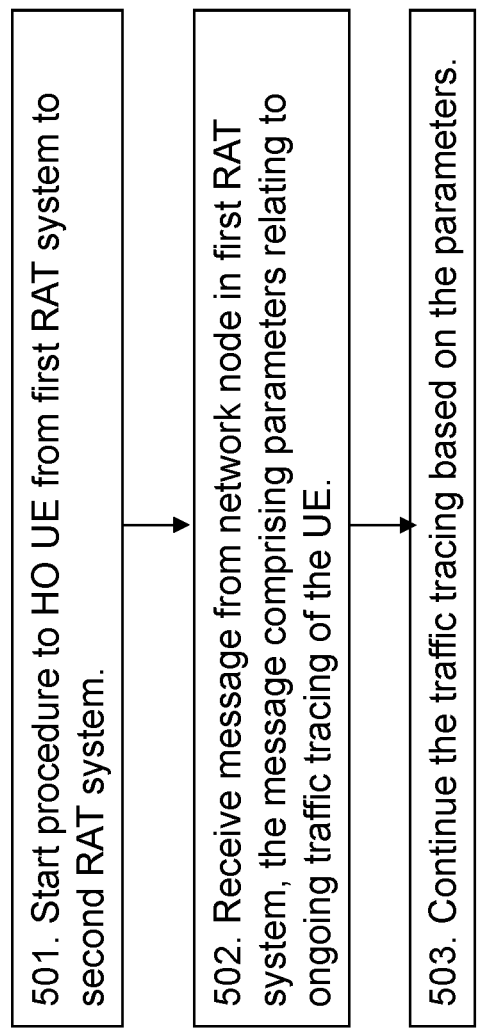
FIG. 5 is a flowchart depicting embodiments of a method in a second network node.

Example embodiments of a method in the second network node 112 for handling traffic tracing of the user equipment 120 will now be described with reference to the combined flowchart and signalling diagram of FIG. 4 and a flowchart of FIG. 5. As mentioned above, the second network node 112 is comprised in a second RAT system 102.

The method is described in a general way first. The method will then be described more in detail below. The method comprises the following actions, which actions may be taken in any suitable order. Dashed lines of a box in FIG. 5 indicate that this action is not mandatory.

In the example scenario, the user equipment 120 is connected to the first network node 111 in the first RAT system 101 but shall be handed over to connect to the second network node 112 in the second RAT system. This means a handover between two different RATs.

In some embodiments, the RAT of the first RAT system 101 is LTE, and the RAT of the second RAT system 102 is WCDMA.

In some embodiments, the RAT of the first RAT system 101 is WCDMA, and the RAT of the second RAT system 102 is LTE.

In some embodiments, the RAT of the first RAT system 101 is LTE or WCDMA and the RAT of the second RAT system 102 is WiFi or WLAN.

In some embodiments, the RAT of the first RAT system 101 is WiFi or WLAN and the RAT of the second RAT system 102 is LTE or WCDMA.

The the RAT of first and second RAT systems 101, 102 may further each be any one out of GSM, WiMax, CDMA, and CDMA2000.

Action 501

The second network node 112 starts the handover procedure to handover the user equipment 120 from the first RAT system 101 to the second RAT system 102. As mentioned above this start of the handover procedure may be performed by sending an acknowledgement to the first network node 111 as a response to a handover order or handover request received from the first network node 111, if the handover order or handover request is accepted by the second network node 112. This means that the wording that the second network node 112 starts the handover procedure, means here that the procedure is started in the second network node 112, but not necessarily that the second network node 112 initiates the handover procedure. In many cases, a handover procedure is initiated by a source network node such as e.g. the first network node 111.

The user equipment 120 has an active traffic tracing ongoing in the first RAT system 101, and which traffic tracing relates to tracing associated with communication between the user equipment 120 and the first RAT system 101, The traffic tracing may e.g. relate to area based tracing or subscriber tracing.

Action 502

The second network node 112 receives the message from a first network node 111 in the first RAT system 101. The message is sent directly to the second network node 112 or via the one or more intermediate network nodes 113. The message comprises one or more parameters relating to the ongoing traffic tracing of the user equipment 120. The parameters define when the traffic tracing is to continue in the second RAT system 102.

The one or more parameters may comprise a parameter indicating whether or not the user equipment 120 is part of a user equipment fraction in the first RAT system 101. The user equipment fraction refers to a subset of all the user equipments within an area of the first RAT system 101 where only the subset of the user equipments have ongoing traffic tracing.

In some embodiments the one of the one or more parameters is the trace reference to the user equipment 120. In these embodiments the traffic tracing relates to signalling based subscriber and equipment trace. The trace reference to the user equipment 120 may have been allocated as described above.

The one or more parameters may comprise any one or more out of: a trace reference, a technology preference, a service preference, a device model preference as described above.

In some embodiments, wherein one of the one or more parameters is the trace reference to the user equipment 120, the traffic tracing relates to signalling based subscriber and equipment trace.

The one or more parameters may be comprised in a transparent container in the message.

Action 503

Based on the one or more parameters, the second network node 112 may continue the traffic tracing of the user equipment 120 in the second RAT system 102.

Thanks to the knowledge of the one or more parameters, it is possible to know which user equipments that shall continue the traffic tracing of the user equipment 120 after the handover from one RAT system such as the first RAT system 101, to another RAT system such as the second RAT system 102.

Embodiments herein will now be exemplified and explained more in detail. The text below refers to any suitable embodiment as described above.

Trace Reference

According to some embodiments, if a usable trace reference is not already allocated for the user equipment 120 that can be used in the second network node 112, the first network node 111 needs to request a trace reference to be used in second network node 112 from a Network Management System (NMS). Once that trace reference is allocated and shared with the first network node 111, the first network node 111 need to record the trace reference with another UE identity of the user equipment 120, e.g. a trace reference in the first network node 111, so that this identity pair is known in a Trace Collection Entity (TCE).

Area based Cell Traffic Trace between LTE and WCDMA System

In some embodiments, the traffic tracing is area based Cell Traffic Trace is used in the first and second RAT systems 101, 102 being a respective LTE and WCDMA RAT system. In these embodiments, the transparent container may be a Source To Target Transparent Container on S1AP (S1 Application Protocol) and a Radio Access Network Application Part RANAP are used to for the parameters. One container for each direction, depending on which node that originates the container it will be according to different standards and hence different names. S1 is the Interface between eNB and CN. In these embodiments, a special format of the Source To Target Transparent Container on S1AP and RANAP, Area Based Trace Activation Transparent Container, here called CTR-PDU may be used. Source To Target Transparent Container on S1AP and RANAP, and Area Based Trace Activation Transparent Container exist in standard today.

CTR-PDU is used herein as a name for Source To Target Transparent Container on S1AP and RANAP, Area Based Trace Activation Transparent Container that have been adapted to carry this new information needed in the provided method.

Cell Trace in LTE to be Continued as GPEH or Cell Trace in WCDMA

In some embodiments wherein the first RAT is LTE and the second RAT is WCDMA, the cell traffic trace in LTE may be continued as a traffic trace such as General Performance Event Handling (GPEH) or Cell Trace in WCDMA.

In these embodiments, the first network node 111 e.g. an eNB generates a CTR-PDU comprising the one or more parameters such as e.g. Trace activation information that one of the intermediate nodes 113 e.g. an MME or SGSN, requires for its trace activation when the first user equipment has been handed over to the second RAT system 102. The CTR-PDU is added to an S1AP Handover Required message that is sent to another one of the intermediate nodes 113 such as an MME as a Source To Target Transparent Container. This piggy-backing of CTR-PDU continues in the handover signalling for the IRAT handover from the MME to another intermediate network node such as an SGSN and then later to the second network node 112 i.e. the RNC in this scenario. Once received by the second network node 112, the second network node 112 can initiate the traffic trace. In LTE eNB controls/initiates traces, in WCDMA that functionality lies in the RNC.

Piggy backing is when information is added to an existing message. The piggy backed info is not vital for the original purpose of the message. E.g. the messages that are sent are for handover and to succeed with the handover. The CTR-PDU is not important to the handover procedure as such. Hence when the CTR-PDU is added to the handover message, the handover message has been piggy-backed.

In these embodiments, the transparent container here referred to as CTR-PDU comprises the one or more parameters such as the required parts from activateTraceJob as defined in 3GPP, Table A.2.2.1, 32.446 v11.5.0.

The CTR-PDU may further comprise the parameter indicating whether or not the user equipment 130 was included in a user equipment fraction in the source system, i.e. the first RAT system 101. This means that optionally the source system, i.e. the first network node 111 in the first RAT system 101 may omit to include the CTR-PDU if UE is not part of the current UE Fraction.

GPEH or Cell Trace in WCDMA to be Continued as LTE Cell Trace

In some other embodiments wherein the first RAT is WCDMA and the second RAT is LTE, the traffic trace in WCDMA is GPEH or Cell Trace which may be continued as Cell Trace in LTE.

In These embodiments, the first network node 111 which may be an RNC generates a CTR-PDU comprising the one or more parameters which CTR-PDU is piggy-backed in the message to one of the intermediate nodes 113 such as a SGSN. In this scenario the message is a RANAP RELOCATION REQUIRED message. This piggy-backing of the transparent container herein referred to as the CTR-PDU continues in the handover signalling for the IRAT handover from the intermediate node SGSN to the intermediate node MME and then further on with an S1AP Handover Request message to the second network node 112 which in this scenario is an eNB.

In these embodiments, the one or more parameters comprised in the generated CTR-PDU include the required parts from activateTraceJob as defined in 3GPP, Table A.2.2.1, 32.446 v11.5.0.

The CTR-PDU may further comprise as one of the one or more parameters the parameter indicating whether or not the user equipment 120 was included in the user equipment fraction in the source system, i.e. the first RAT system 101. This means that optionally the source system, i.e. the first network node 111 in the first RAT system 101 may omit to include the CTR-PDU if the user equipment 120 is not part of the current user equipment fraction.

For Subscriber Tracing (UETR) Between LTE and WCDMA System

In some embodiments the first RAT is LTE, the second RAT is WCDMA, and the traffic trace in LTE is subscriber tracing which may be continued as Subscriber tracing in WCDMA. As an alternative for the transparent container, a special format of the Source To Target Transparent Container on S1AP and RANAP, Subscriber and Equipment Based Trace Activation Transparent Container, here called UETR-PDU may be used.

In these embodiments the first network node 111 which in this case is an eNB, generates an UETR-PDU with the one or more parameters such as the Trace activation information that the second network node 112 which may be an RNC in this case requires for its trace activation. The UETR-PDU may added to the S1AP Handover Required message that is sent to the intermediate network node which in this case is an MME, as a Source To Target Transparent Container. This piggy-backing of UETR-PDU continues in the handover signalling for the IRAT handover from MME to SGSN and then later to the second network node 112, i.e. the RNC.

Once received by RNC, the RNC can initiate the traffic trace signaling based activation from the RNC towards NMS.

If IMSI is not available at the reception of UETR-PDU, then the second network node 112 such as the RNC may temporarily save the pmEvents for this user equipment context and then when available save to the UETR file and/or stream of the user equipment 120. A pmEvent is one data record in a Trace Recording.

In these embodiments, the one or more parameters comprised in the generated UETR-PDU include the required parts from activateTraceJob as defined in 3GPP 32.446 V11.5.0.

The UETR-PDU may further comprise as one of the one or more parameters, a parameter indicating whether or not the user equipment 120 was included in the user equipment fraction in the source system, i.e. the first RAT system 101.

The activateTraceJob may preferably also be updated to state which technologies that the UETR-PDU shall be forwarded to, e.g. it may be so that it only is needed to do tracing in WCDMA, but not in GSM.

Optionally the source system, i.e. the first network node 111 in the first RAT system 101 may omit to include the IE CTR-PDU if the user equipment 120 is not part of the current user equipment fraction.

UETR in WCDMA to be Continued as LTE UETR

In some other embodiments wherein the first RAT is WCDMA and the second RAT is LTE, the traffic trace in WCDMA is Subscriber tracing which may be continued as Subscriber tracing in LTE.

A prerequisite is that RNC and NMS agree on the parameter Trace Reference in the WCDMA system as being one of the one or more parameters. Both RNC and NMS should be aware of the Trace Reference and IMSI coupling for the UE Traces.

The first network node 111 which is an RNC in this case, generates an UETR-PDU which is piggy-backed in a RANAP RELOCATION REQUIRED to SGSN. This piggy-backing of UETR-PDU continues in the handover signalling for the IRAT handover from the intermediate node SGSN to the intermediate node MME and then later to the second network node which in this case is an eNB, with an S1AP Handover Request message.

The one or more parameters comprised in the UETR-PDU may include the following information:

Trace Reference for user equipment 120 that RNC in the first RA and OSS agreed on. OSS is comprised in NMS, so it relates both first and second RATs, but may also be so that it relates only the first RAT, then the OSS of the first RAT contacts the SS of the second RAT over the P2P itf (interface).

The required parts from activateTraceJob as defined in 3GPP 32.446 V11.5.0.

The activateTraceJob may preferably also be updated to state which technologies, i.e. which RAT that the UETR-PDU shall be forwarded to. E.g. it may be so that it only is needed to do perform traffic tracing in WCDMA, but not in GSM.

Optionally in a once received by second network node 112, the second network node 112 contacts NMS and informs that a traffic trace of the user equipment 120 should be initiated for that Trace Reference which is in that case one of the one or more first parameters. Then NMS just follows legacy procedures to initiate the traffic trace of the user equipment 120 to eNB via MME. An UETR in LTE is initiated from NMS by sending an "activation start message" to MME, that then forwards this "start trace trigger" to eN B. This initiation is already standardized, hence it is referred to as legacy procedure. The reason for doing this optional step may be that the trace reference allocation between first node and its NMS is not globally unique, hence it might not be globally unique in second NMS. Hence the trace reference then become a temporary reference until a proper one is assigned. This may be very useful in multivendor case, e.g. first RAT is a first vendor and second RAT is is a second vendor.

Until the Trace Activation comes via S1AP from the MME, the second network node 112 shall have the option to start traffic trace recording for the user equipment 120 and store recording data based on the Trace Reference.

The methods described above may also be applicable for GSM nodes:

For GSM there is a similar functionality to traffic tracing such as UETR which is called Real Time Trace and is IMSI based, or one referred to as IMEI trace. To have seamless tracing between these and UE Trace is beneficial.

For GSM there is also similar functionalities to area based tracing. To have seamless tracing between these and GPEH/ Cell Trace is also beneficial.

For embodiments wherein handover is going to the GSM system, the transparent containers available to be used may be any one or more of the following:

Packet Switched (PS) handover: In 3GPP specification 48.018 a "Source BSS to Target BSS Transparent Container" message is defined. This one is quite strictly standardized. Possible way forward is to standardize a new IE which may be referred to as "Tracing Request IE"

PS to Circuit Switched (CS) Single Radio Voice Call Continuity (SRVCC): 3GPP specification 48.018 "Old BSS to New BSS information". This one is quite strictly standardized. Possible way forward is to standardize a new IE may be referred to as "Tracing Request IE".

For embodiments wherein handover is going from the GSM system, the transparent containers to available to be used may be any one or more of the following:

PS handover: 48.018 "Source to Target Transparent Container". This one is not that strictly standardized and may be used in a proprietary way.

CS to PS SRVCC to there are transparent container defined in 48.008 "Source eNB to target eNB transparent information, Evolved UTRAN (E-UTRAN)" and "Source RNC to target RNC transparent information, UMTS" which may be sent from BSC to eNB to indicate that tracing shall continue.

Figure 6:
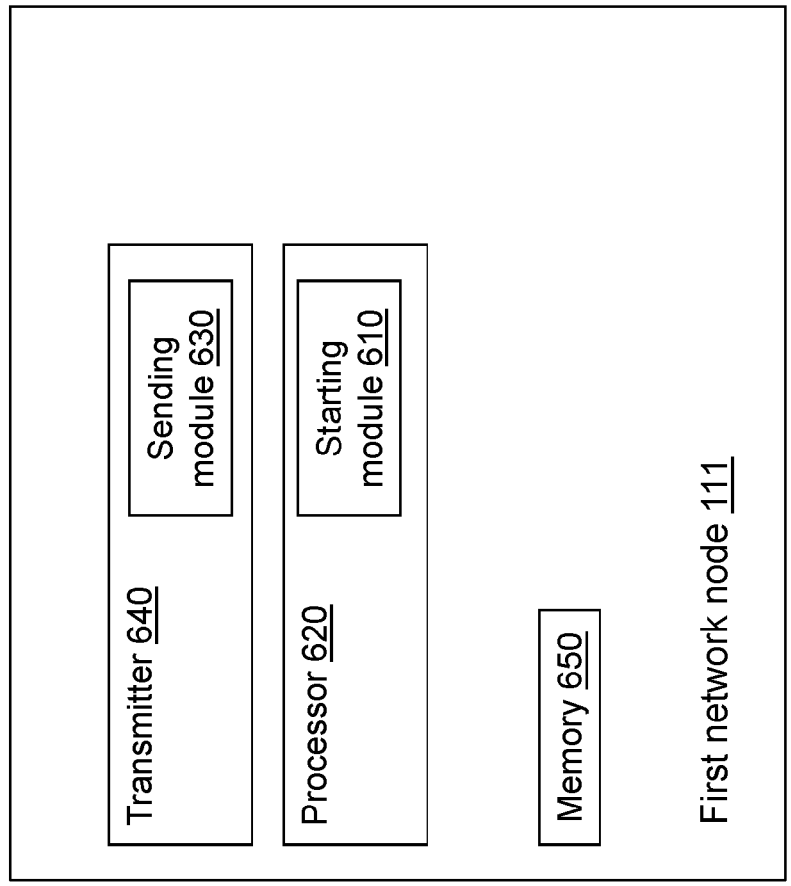
FIG. 6 is a schematic block diagram illustrating embodiments of a first network node.

To perform the method actions for handling traffic tracing of a user equipment 120 described above in relation to FIG. 3 and FIG. 4, the first network node 111 base station 110 may comprise the following arrangement depicted in FIG. 6. As mentioned above the first network node 111 is adapted to be comprised in the first RAT system 101.

The first network node 111 is configured to, e.g. by means of a starting module 610 configured to, start a handover procedure to handover the user equipment 120 from the first RAT system 101 to a second RAT system 102. The user equipment 120 has an active traffic tracing ongoing in the first RAT system 101. The traffic tracing relates to tracing associated with communication between the user equipment 120 and the first RAT system 101. The traffic tracing may relate to area based tracing or subscriber tracing.

In some embodiments, the RAT of the first RAT system 101 is LTE, and the RAT of the second RAT system 102 is WCDMA.

In some embodiments, the RAT of the first RAT system 101 is WCDMA, and the RAT of the second RAT system 102 is LTE.

In some embodiments, the RAT of the first RAT system 101 is LTE or WCDMA and the RAT of the second RAT system 102 is WiFi or WLAN.

In some embodiments, the RAT of the first RAT system 101 is WiFi or WLAN and the RAT of the second RAT system 102 is LTE or WCDMA.

The the RAT of first and second RAT systems 101, 102 may further each be any one out of GSM, WiMax, CDMA, and CDMA2000.

The starting module 610 may be comprised in a processor 620 in the first wireless device 111.

The first network node 111 is further configured to, e.g. by means of a sending module 630 configured to, send a message to a second network node 112 in the second RAT system 102. The message is to be sent directly to the second network node 112 or via one or more intermediate network nodes 113. The message comprises one or more parameters relating to the ongoing traffic tracing of the user equipment 120. The parameters define when the traffic tracing is to continue in the second RAT system 102.

In some embodiments, the one or more parameters comprises a parameter indicating whether or not the user equipment 120 is part of a user equipment fraction in the first RAT system 101. The user equipment fraction refers to a subset of all the user equipments within an area of the first RAT system 101 where only the subset of the user equipments have ongoing traffic tracing.

The one or more parameters may be adapted to be comprised in a transparent container in the message.

The one or more parameters may comprise any one or more out of: a trace reference, a technology preference, a service preference, a device model preference.

In some embodiments, wherein one of the one or more parameters is the trace reference to the user equipment 120, the traffic tracing relates to signalling based subscriber and equipment trace.

The sending module 630 may be comprised in a transmitter 640 such as e.g. a wireless transmitter in the first wireless device 111.

The embodiments herein for handling traffic tracing of a user equipment 120 may be implemented through one or more processors, such as the processor 620 in the first network node 111 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the in the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 650 comprising one or more memory units. The memory 650 is arranged to be used to store the one or more parameters, data, configurations, schedulings, and applications to perform the methods herein when being executed in the first network node 111.

Those skilled in the art will also appreciate that the starting module 610 and the sending module 630 described above may refer to a combination of analog and digital circuits, and/or one or more processors configured with software and/or firmware, e.g. stored in the memory 650, that when executed by the one or more processors such as the processor 620 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Figure 7:
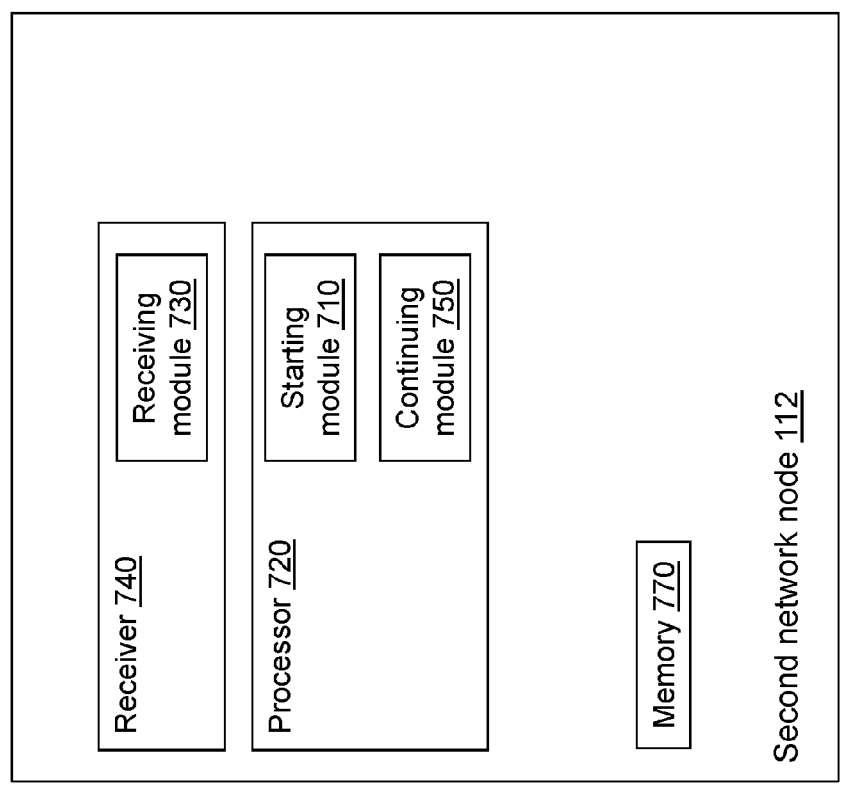
FIG. 7 is a schematic block diagram illustrating embodiments of a second network node.

To perform the method actions for handling traffic tracing of a user equipment 120 described above in relation to FIG. 4 and FIG. 5, the second network node 112 may comprises the following arrangement depicted in FIG. 7. As mentioned above the second network node 112 is adapted to be comprised in the second RAT system 102.

The second network node 112 is configured to, e.g. by means of a starting module 710 configured to, start a handover procedure to handover the user equipment 120 from a first RAT system 101 to the second RAT system 102. The user equipment 120 has an active traffic tracing ongoing in the first RAT system 101. The traffic tracing relates to tracing associated with communication between the user equipment 120 and the first RAT system 101.

In some embodiments, the traffic tracing relates to area based tracing or subscriber tracing.

In some embodiments, the RAT of the first RAT system 101 is LTE, and the RAT of the second RAT system 102 is WCDMA.

In some embodiments, the RAT of the first RAT system 101 is WCDMA, and the RAT of the second RAT system 102 is LTE.

In some embodiments, the RAT of the first RAT system 101 is LTE or WCDMA and the RAT of the second RAT system 102 is WiFi or WLAN.

In some embodiments, the RAT of the first RAT system 101 is WiFi or WLAN and the RAT of the second RAT system 102 is LTE or WCDMA.

The the RAT of first and second RAT systems 101, 102 may further each be any one out of GSM, WiMax, CDMA, and CDMA2000.

The starting module 610 may be comprised in a processor 720 in the second wireless device 112.

The second network node 112 is configured to, e.g. by means of a receiving module 730 configured to, receive a message from a first network node 111 in the first RAT system 101, which message is adapted to be sent directly to the second network node 112 or via one or more intermediate network nodes 113, which message comprises one or more parameters relating to the ongoing traffic tracing of the user equipment 120, and which parameters define when the traffic tracing is to continue in the second RAT system 102.

The receiving module 730 may be comprised in a receiver 740 such as a wireless receiver in the second wireless device 112.

The one or more parameters may comprise a parameter indicating whether or not the user equipment 120 is part of a user equipment fraction in the first RAT system 101. The user equipment fraction refers to a subset of all the user equipments within an area of the first RAT system 101 where only the subset of the user equipments have ongoing traffic tracing.

The one or more parameters may be adapted to be comprised in a transparent container in the message.

In some embodiments, the one or more parameters comprises any one or more out of: a trace reference, a technology preference, a service preference, a device model preference.

In some embodiments, wherein one of the one or more parameters is the trace reference to the user equipment 120, the traffic tracing relates to signalling based subscriber and equipment trace.

The second network node 112 is configured to, e.g. by means of a continuing module 750 configured to, continue the traffic tracing of the user equipment 120 in the second RAT system 102 based on the one or more parameters.

The continuing module 750 may be comprised in the processor 720 in the second wireless device 112.

The embodiments herein for handling traffic tracing of a user equipment 120 may be implemented through one or more processors, such as the processor 720 in the second network node 112 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the in the second network node 112. One such carrier may be in the form of a CD ROM disc. It is however feasible with other data carriers such as a memory stick. The computer program code may furthermore be provided as pure program code on a server and downloaded to the second network node 112.

The second network node 112 may further comprise a memory 770 comprising one or more memory units. The memory 770 is arranged to be used to store the one or more parameters, data, configurations, schedulings, and applications to perform the methods herein when being executed in the second network node 112.

Those skilled in the art will also appreciate that the starting module 710, the receiving module 730, and the continuing module 750 described above may refer to a combination of analog and digital circuits, and/or one or more processors configured with software and/or firmware, e.g. stored in the memory 770, that when executed by the one or more processors such as the processor 720 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

ABBREVIATIONS

3GPP 3rd Generation Partnership Project
AC Access Controller
AP Access Point
APN Access Point Name
CN Core Network
eNodeB E-UTRAN NodeB
eNB E-UTRAN NodeB
EPC Evolved Packet Core
E-UTRAN Evolved UTRAN
FAP Femto Access Point
FQDN Fully Qualified Domain Name
GUMMEI Globally Unique MME Identity
GUTI Globally Unique Temporary Identity
GW Gateway
HAP Home Access Point
HeNB Home eNB
HeNB GW Home eNB Gateway
ID Identity
IE Information Element
IP Internet Protocol
LTE Long Term Evolution
MCC Mobile Country Code
MLP Mobile Location Protocol
MME Mobility Management Entity MMEC MME Code
MMEGI MME Group Identity
MNC Mobile Network Code
M-TMSI M-Temporary Mobile Subscriber Identity
NAS Non-Access Stratum
NE Network Element
NMS Network Management System
O&M Operation and Maintenance
PLMN Public Land Mobile Network
PLMN ID PLMN Identity
RAN Radio Access Network
RRC Radio Resource Control
S1 Interface between eNB and CN.
S1AP S1 Application Protocol
S1-MMEControl Plane of S1.
SSID Service Set Identifier
S-TMSI S-Temporary Mobile Subscriber Identity.
TA Tracking Area
TAI Tracking Area Identity
TAU Tracking Area Update
UE User Equipment
UTRAN Universal Terrestrial Radio Access Network
X2 Interface between eNBs.
xDSL X Digital Subscriber Line (referring to the DSL family of technologies where "X" stands for any of the letters that can be placed before "DSL", e.g. A or V)

The invention claimed is:

1. A method in a first network node for handling traffic tracing of a user equipment, wherein the first network node is comprised in a first Radio Access Technology (RAT) system, the method comprising:
    starting a handover procedure to handover the user equipment from the first RAT system to a second RAT system, wherein the user equipment has an active traffic tracing ongoing in the first RAT system, and wherein traffic tracing relates to tracing associated with communication between the user equipment and the first RAT system;
    sending a message to a second network node in the second RAT system, wherein the message is sent directly to the second network node or via one or more intermediate network nodes, wherein the message comprises one or more parameters relating to the ongoing traffic tracing of the user equipment, and wherein the one or more parameters comprises a parameter indicating whether or not the user equipment is part of a user equipment fraction in the first RAT system, wherein the user equipment fraction refers to a subset of all the user equipments within an area of the first RAT system where only the subset of all the user equipments have ongoing traffic tracing; and
    wherein the parameter indicating whether or not the use equipment is part of a user equipment fraction indicates a priority of the use equipment for continued traffic tracing.

2. The method according to claim 1, wherein the one or more parameters are comprised in a transparent container in the message.

3. The method according to claim 1, wherein the one or more parameters comprises any one or more out of: a trace reference, a technology preference, a service preference, a device model preference.

4. The method according to claim 1, one of the one or more parameters is a trace reference to the user equipment, and the traffic tracing relates to signalling based subscriber and equipment trace.

5. The method according to claim 1,
    wherein the RAT of the first RAT system is Long Term Evolution (LTE), and the RAT of the second RAT system is Wideband Code Divisional Access (WCDMA), or
    wherein the RAT of the first RAT system is WCDMA, and the RAT of the second RAT system is LTE, or
    wherein the RAT of the first RAT system is LTE or WCDMA and the RAT of the second RAT system is WiFi or Wireless Local Area network, WLAN, or
    wherein the RAT of the first RAT system is WiFi or WLAN and the RAT of the second RAT system is LTE or WCDMA.

6. The method according to claim 1, wherein the traffic tracing relates to area based tracing or subscriber tracing.

7. A method in a second network node for handling traffic tracing of a user equipment, wherein the second network node is comprised in a second Radio Access Technology (RAT) system, the method comprising:
    starting a handover procedure to handover the user equipment from a first RAT system to the second RAT system, wherein the user equipment has an active traffic tracing ongoing in the first RAT system, and wherein the traffic tracing relates to tracing associated with communication between the user equipment and the first RAT system;
    receiving a message from a first network node in the first RAT system, wherein the message is sent directly to the second network node or via one or more intermediate network nodes, wherein the message comprises one or more parameters relating to the ongoing traffic tracing of the user equipment, wherein the one or more parameters comprises a parameter indicating whether or not the user equipment is part of a user equipment fraction in the first RAT system, wherein the user equipment fraction refers to a subset of all the user equipments within an area of the first RAT system where only the subset of all the user equipments have ongoing traffic tracing; and
    prioritizing the user equipment for continued traffic tracing based on at least the parameter indicating whether or not the user equipment is part of a user equipment fraction in the first RAT system.

8. The method according to claim 7, one of the one or more parameters is a trace reference to the user equipment, and the traffic tracing relates to signalling based subscriber and equipment trace.

9. The method according to claim 7, wherein the one or more parameters are comprised in a transparent container in the message.

10. The method according to claim 7, wherein the one or more parameters comprises any one or more out of: a trace reference, a technology preference, a service preference, a device model preference.

11. The method according to claim 7,
    wherein the RAT of the first RAT system is Long Term Evolution (LTE), and the RAT of the second RAT system is Wideband Code Divisional Access (WCDMA), or
    wherein the RAT of the first RAT system is WCDMA, and the RAT of the second RAT system is LTE, or
    wherein the RAT of the first RAT system is LTE or WCDMA and the RAT of the second RAT system is WiFi or Wireless Local Area network, WLAN, or
    wherein the RAT of the first RAT system is WiFi or WLAN and the RAT of the second RAT system is LTE or WCDMA.

12. The method according to claim 7, wherein the traffic tracing relates to area based tracing or subscriber tracing.

13. A first network node for handling traffic tracing of a user equipment, wherein the first network node is adapted to be comprised in a first Radio Access Technology (RAT) system, the first network node being configured to:
- start a handover procedure to handover the user equipment from the first RAT system to a second RAT system, wherein the user equipment has an active traffic tracing ongoing in the first RAT system, and wherein traffic tracing relates to tracing associated with communication between the user equipment and the first RAT system;
- send a message to a second network node in the second RAT system, wherein the message is to be sent directly to the second network node or via one or more intermediate network nodes, wherein the message comprises one or more parameters relating to the ongoing traffic tracing of the user equipment, wherein the one or more parameters comprises a parameter indicating whether or not the user equipment is part of a user equipment fraction in the first RAT system, wherein the user equipment fraction refers to a subset of all the user equipments within an area of the first RAT system where only the subset of all the user equipments have ongoing traffic tracing; and
- wherein the parameter indicating whether or not the use equipment is part of a user equipment fraction indicates a priority of the use equipment for continued traffic tracing.

14. The first network node according to claim 13, wherein the one or more parameters comprises a parameter indicating whether or not the user equipment is part of a user equipment fraction in the first RAT system, which user equipment fraction refers to a subset of all the user equipments within an area of the first RAT system where only the subset of the user equipments have ongoing traffic tracing.

15. The first network node according to claim 13, wherein the one or more parameters are adapted to be comprised in a transparent container in the message.

16. The first network node according to claim 13, wherein the one or more parameters comprises any one or more out of: a trace reference, a technology preference, a service preference, a device model preference.

17. The first network node according to claim 13, one of the one or more parameters is a trace reference to the user equipment, and the traffic tracing relates to signalling based subscriber and equipment trace.

18. The first network node according to claim 13,
- wherein the RAT of the first RAT system is adapted to be Long Term Evolution (LTE), and the RAT of the second RAT system is adapted to be Wideband Code Divisional Access (WCDMA), or
- wherein the RAT of the first RAT system is adapted to be WCDMA, and the RAT of the second RAT system is adapted to be LTE, or
- wherein the RAT of the first RAT system is adapted to be LTE or WCDMA and the RAT of the second RAT system is adapted to be WiFi or Wireless Local Area network, WLAN, or
- wherein the RAT of the first RAT system is adapted to be WiFi or WLAN and the RAT of the second RAT system is adapted to be LTE or WCDMA.

19. The first network node according to claim 13, wherein the traffic tracing relates to area based tracing or subscriber tracing.

* * * * *